Figure 1:
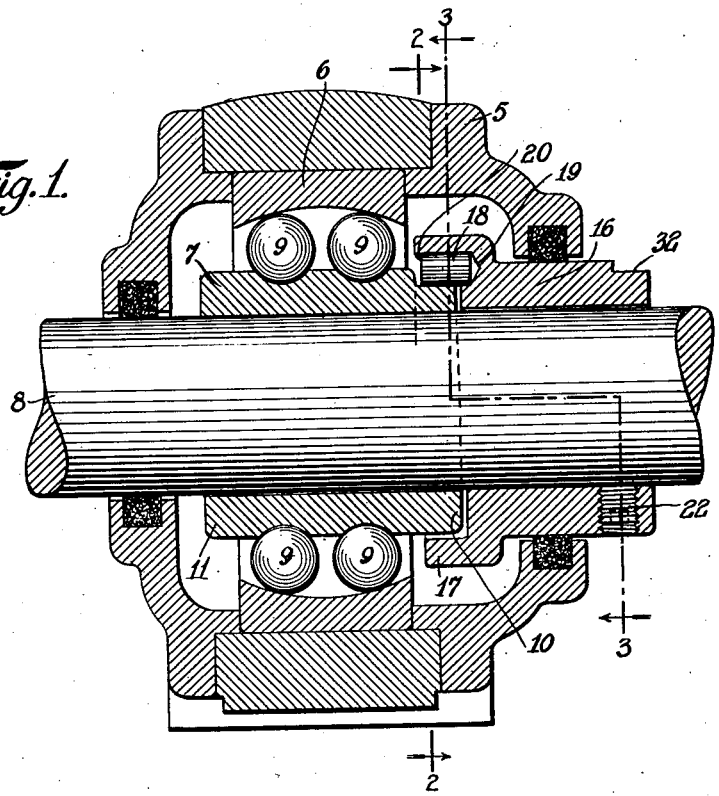

Dec. 8, 1931.  R. F. RUNGE  1,835,991
MEANS FOR SECURING ANTIFRICTION BEARINGS ON SHAFTS
Filed June 24, 1929  2 Sheets-Sheet 1

INVENTOR
ROBERT F. RUNGE
BY
ATTORNEY

Dec. 8, 1931. R. F. RUNGE 1,835,991
MEANS FOR SECURING ANTIFRICTION BEARINGS ON SHAFTS
Filed June 24, 1929 2 Sheets-Sheet 2

INVENTOR
ROBERT F. RUNGE
BY
ATTORNEY

Patented Dec. 8, 1931

1,835,991

UNITED STATES PATENT OFFICE

ROBERT F. RUNGE, OF FOREST HILLS GARDENS, LONG ISLAND, NEW YORK, ASSIGNOR TO THE SKAYEF BALL BEARING COMPANY, OF HARTFORD, CONNECTICUT, A CORPORATION OF CONNECTICUT

MEANS FOR SECURING ANTIFRICTION BEARINGS ON SHAFTS

Application filed June 24, 1929. Serial No. 373,118.

This invention relates to a device for securing the inner ring of an antifriction bearing directly to a shaft. In the preferred form of my invention the inner ring of a ball bearing, which has a bore of a diameter very slightly in excess of that of the shaft upon which it is to be mounted, is provided with an extension from at least one end, which extension in the main is concentric with the axis of the bore, and one side of the extension is formed with a face which affords two curved cams. These cam faces are preferably formed by reducing the outside dimension of the extension. A collar is provided which is adapted to be mounted on the shaft adjacent this extension, and has an extending flange concentric with its bore, and formed to freely overlie the bearing extension. In which flange there is mounted a cam engaging member—in the preferred form a hardened steel stud—which upon relative rotation of the collar and inner ring of the bearing rides up on the cam face and securely locks the parts in position.

As a refinement of the invention, means are provided for distributing the load carried by the collar in its shaft engagement on the side opposite the cam engaging member. Normally this load would be borne by a mathematical straight line diametrically opposite the line or point of cam engagement. This refinement provides means for extending such engagement over a considerable sector. In practice it will be means for affording points of engagement at each side of the point of contact diametrically opposite the cam engaging contact.

In the drawings accompanying this specification one practicable embodiment of the invention is illustrated, which at present is the preferred form, although it is to be understood that changes in details of construction may be made within the scope of the claims without departing from the spirit of my invention.

In these drawings, Figure 1 shows in longitudinal section a pillow block and a bearing mounted therein equipped with a form of my invention, a broken portion of a shaft being illustrated upon which the inner ring of the bearing is shown locked.

Figure 2:
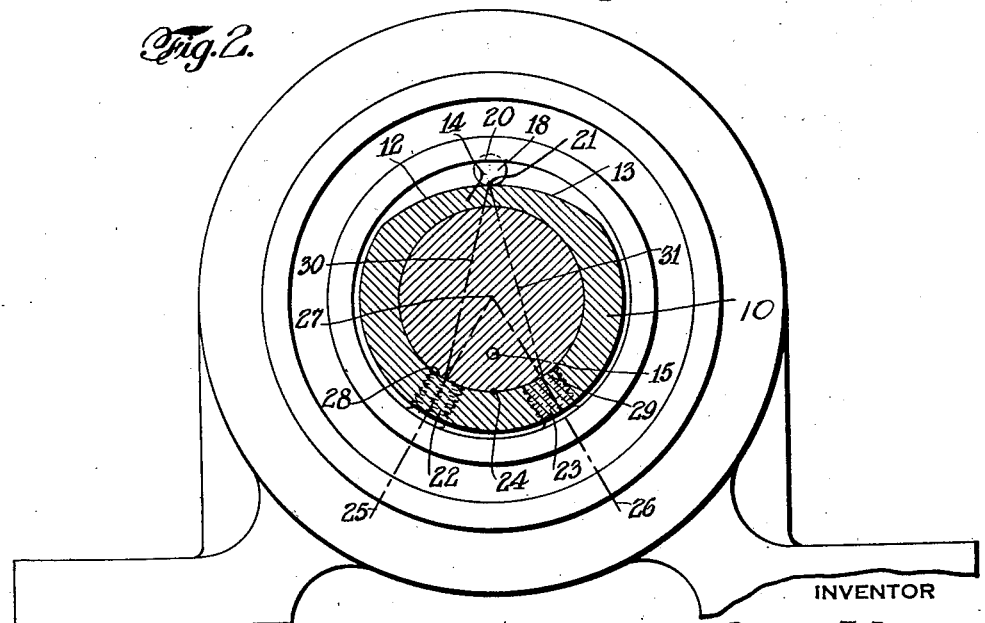
Figure 3:
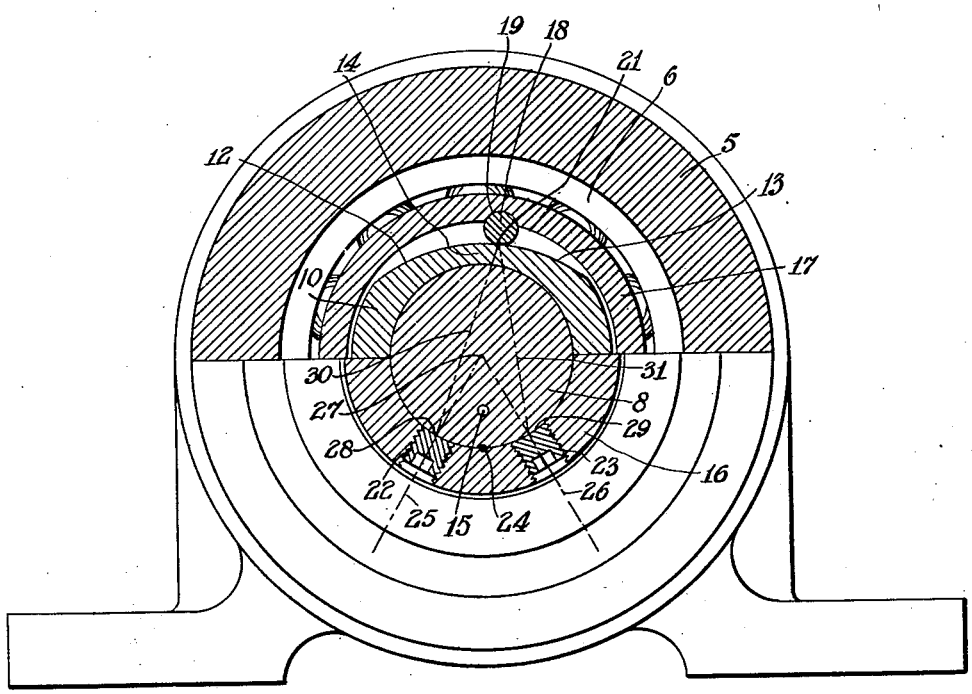

Fig. 2 is a cross-sectional view of the parts illustrated in Figure 1 at about the line 2—2 in such figure, looking in the direction of the arrows, and Fig. 3 is another cross-sectional view on the planes at about the line 3—3 in Figure 1.

The pillow block designated in a general way by the reference character 5 is shown for the purpose of illustrating one form of mounting the outer race ring 6 of the ball bearing, the inner ring 7 of which is to be securely mounted, by means of the problem which I have solved, on the shaft 8. The shaft 8 in the illustration will be assumed to be such a shaft as is used in many machine applications and is of a substantially uniform diameter from end to end. Or is substantially uniform for a considerable distance inwardly of at least one end.

Between the rings 6 and 7 are shown antifriction rolling elements 9 which are illustrated in the form of spherical rollers. Both ends 10 and 11 of the inner ring 7 are shown projecting beyond the ends of the ring 6. In this connection it might possibly be more accurate to say sides when the bearing is considered by itself. When it is considered in connection with its bore and the axis of the shaft upon which it is mounted, possibly ends is a more convenient term to use.

In the main, the ends 10 and 11 are formed with perimeters which are concentric with the bore of the ring 7. In the illustration the extension 10, having an outer surface concentric in the main with the bore, has a portion at one side formed on a much flatter curve than the curvature of the main surface. This is for the purpose of affording two cam faces 12 and 13 rising from the center or low portion 14. In the illustration these cam faces are continuous portions of a cylindrical segment having its center at about the point 15. All portions of the cam in the form illustrated are of less outside dimension than is the body of the extension. The radius of the cylindrical segment is much longer than the radius of the body portion of the extension. Consequently the cam faces 12 and 13 press a much flatter surface for the engagement of the steel stud 18, presently to be described, than would the normal cylindrical surface of this body portion.

The fastening device for cooperation with the cams 12 and 13 is illustrated in the form of a collar 16 having a flange 17 which is adapted to overlie or overhang the extension 10 of the bearing. The inner face of this flange 17 is concentric with the bore of the collar and substantially concentric with the main portion of the perimeter of the extending end 10, but is so proportioned that it will, at all times when the device is in operation, be free of such extension. The inside of this flange carries a member for riding upon the cam faces 12 and 13. In the illustration a hardened steel stud 18 is provided for affording the cam engaging surface, such stud being shown as carried in a secondary recess 19 in the sleeve. As a convenient means for applying the stud, the recess 19 may be formed by boring a hole member or collar 16 partly in the flange and partly extending into the body of the collar in which the hardened cylindrical stud 18 is inserted. The stud may be held in place by peening over the end of the flange as at 20. The stud, of course, will be somewhat shorter than the hole or socket bored for it, which will facilitate this peening operation.

The engagement between the member 18 and the cams 12 and 13 is between two reversely convex cylindrical surfaces, and consequently mathematically the area of this engagement is a line to line contact. While this is only theoretically correct, the importance of the relation of the position of this line to other parts of the device can best be explained by reference to Fig. 3, the line being indicated at the point 21.

Owing to the largeness of the radius of the spherical segment embraced in the cams 12 and 13, the cam engaging member or stud 18, when it is caused to ride up, one or the other of these cam faces has a tendency, aside from the jamming action of the parts to remain in its position of adjustment, since the angularity between the cam surface upon which its rests and its line of backing off movement approximates the angle of repose.

As a means for extending the area of shaft and collar engagement at the side opposite the engagement of the cam by the member 18, I provide a pair of set screws 22, 23 which are seated in sockets located upon the respective sides of the point 24 indicating the normal line of contact between the collar and the shaft when the stud has tightly ridden up on one or the other of the cam faces 12 and 13.

The axes 25 and 26 of the set screws 22 and 23 are preferably disposed radially of the axis of the collar, which for the purposes of our present discussion may be assumed to be substantially the same as the axis 27 of the shaft. And consequently the set screws move inwardly when set up on lines which converge at or substantially at such axis.

The centers of the set screws are disposed substantially equal distances from the theoretical line of contact between the collar and shaft indicated by the point 24 above mentioned which is disposed diametrically opposite the line of contact between the cam and its engaging member 21.

In a cross-sectional sense the ends of the set screws, being either ball pointed or substantially flat, engage the shaft at points 28, 29 which are in the line of the axes of the set screws. That one of the straight lines 30, 31 connecting these points with the point of cam engagement 21 which is the shortest, is angularly disposed in relation to the axial line of its adjacent set screw.

The collar 16 by virtue of the position of the set screws has in effect a three point contact with the shaft, namely, diametrically opposite the point of cam engagement, and at a point on each side of this diametrical point of engagement. Each of the lines 30, 31 is considerably shorter than the shaft diameter. So that the turning moment in relation to the shaft is resisted by a force acting in line at an angle to the diameter above identified, which line is shorter than such diameter, thereby causing a more secure clamping effect than would be afforded by collar-shaft engagement at a point diametrically opposite the point of cam engagement.

It will be noted that the collar is illustrated as extending outwardly beyond the cover of the box so that the set screws and socket engaging slots 32 are in positions where the millwright may readily manipulate the locking device while the box is closed.

Having thus described my invention, I claim and desire to secure by Letters Patent:

1. The combination with an antifriction bearing inner ring having at one side an extension, the main portion of the outer surface of which being concentric with the bore of the ring, another part of such outer surface being formed as a cam, of a locking collar formed with a bore adapted to be mounted on a shaft and having at one side a flange, the inner face of which is concentric to its bore and of larger radius than the radius of the extension of the ring, and which latter it is adapted to overhang, there being a secondary recess formed in the flange and a stud located in the secondary recess and adapted to ride on the said cam upon relative rotation of the collar and ring.

2. The combination with an antifriction bearing inner ring having at one side an extension, the main portion of the outer surface of which being concentric with the bore of the ring and another part of such outer surface being formed as a pair of oppositely facing cams, of a collar having a bore adapted to be mounted on a shaft and at one side a flange, the inner face of which is concentric to its bore and of larger radius than the radius of the extension of the ring, and which latter it is adapted to overhang, there being a secondary recess formed in the flange and a stud located in the secondary recess and adapted to ride on the said cam upon relative rotation of the collar and ring, a cam engaging member carried by the flange and extending inwardly of the inner face thereof and located in position to ride on one or the other of the said cams upon relative rotation of the collar and ring, and a pair of radially movable set screws carried by the collar and located upon the respective sides of the normal line of contact between the collar and shaft when the stud has tightly ridden up on one or the other of cam faces.

Signed at New York, N. Y. this 11th day of June, 1929.

ROBERT F. RUNGE.